G. C. MURRAY.
SHOCK ABSORBER.
APPLICATION FILED JUNE 4, 1908.

927,810.

Patented July 13, 1909.
6 SHEETS—SHEET 1.

WITNESSES:
H. Crocheron
Ida G. Gilmore

INVENTOR
George C. Murray
BY
Nicholas M. Goodlett Jr.
his ATTORNEY

G. C. MURRAY.
SHOCK ABSORBER.
APPLICATION FILED JUNE 4, 1908.

927,810.

Patented July 13, 1909.
6 SHEETS—SHEET 2.

WITNESSES:
H. Crockern
Ida G. Gilmore

INVENTOR
George C. Murray.
BY
Nicholas M. Goodlett Jr.
his ATTORNEY

G. C. MURRAY.
SHOCK ABSORBER.
APPLICATION FILED JUNE 4, 1908.

927,810.

Patented July 13, 1906.

WITNESSES:

INVENTOR
George C. Murray,
BY
Nicholas M. Goodlett Jr.
his ATTORNEY

G. C. MURRAY.
SHOCK ABSORBER.
APPLICATION FILED JUNE 4, 1908.

927,810.

Patented July 13, 1909.
6 SHEETS—SHEET 5.

WITNESSES:
J. H. Crocker
Ida G. Gilmore

INVENTOR
George C. Murray,
BY Nicholas M. Goodlett Jr.
his ATTORNEY

G. C. MURRAY.
SHOCK ABSORBER.
APPLICATION FILED JUNE 4, 1908.

927,810.

Patented July 13, 1909.
6 SHEETS—SHEET 6.

Witnesses:
H. Crockeron
Ida G. Gilmore

Inventor
George C. Murray.
By his Attorney
Nicholas M. Goodlett Jr.

UNITED STATES PATENT OFFICE.

GEORGE C. MURRAY, OF NEW YORK, N. Y.

SHOCK-ABSORBER.

No. 927,810.    Specification of Letters Patent.    Patented July 13, 1909.

Application filed June 4, 1908. Serial No. 436,545.

*To all whom it may concern:*

Be it known that I, GEORGE C. MURRAY, a citizen of the United States, and a resident of the borough of Manhattan, city, county, and State of New York, have invented certain new and useful Improvements in Shock-Absorbers, of which the following is a specification.

The object of my invention is to provide an improved shock absorber, more particularly adapted for use as a draft rigging for railway cars, but also applicable to other mechanisms in which the gradual absorption of shocks is necessary or desirable.

Stated generally, one of the purposes of my invention is to apply the force of the blow or shock to the spring or other yielding element with progressively decreasing advantage, and to provide mechanisms of such form that the rate of decrease may be varied at will by altering the conformation of certain of the elements employed. At the initiation of the blow or shock almost the entire force, or a large component thereof, may be transmitted to the spring or other yielding element, and as the force continues to act the component thereof acting to compress the spring or yielding resistance element may be decreased at any rate desired according to the conformation of the surfaces of certain coacting parts, while the remainder of said force will cause compression and friction between the elements of the mechanism and be thus absorbed.

My invention, in one aspect, may be considered as involving the use of wedges or inclined planes of varying inclination, with an intervening pressure transmitting member, which preferably takes the form of a roller, though in some cases a pressure transmitting member of other form may be employed. While the variably inclined wedges referred to are preferably formed with surfaces having a continuous curvature, my invention may in some instances be applied by the use of wedges having a series of angularly disposed plane surfaces. In any event, the mechanism progressively decreases the component of the applied force acting upon the spring or other yielding member, and increases the component absorbed in compression and friction, the ultimate effect being equivalent to an increase in the resistance acting in opposition to that force. Otherwise stated, the ratio of compression of the yielding resistance element to the distance through which the applied force acts progressively increases during the action of the force, *i. e.*, the resistance is accelerated.

The objects and nature of my invention will more clearly appear from the following description and accompanying drawings in which—

Fig. 6ᵃ is a perspective view of another of the thrust members forming part of the structure shown in Figs. 1 to 4.

Referring now to the form of my invention shown in Figs. 1 to 6ª inclusive, the draft sills 1 may be of any preferred form. Secured to the draft sills are front stops 3, 4 and back stops 5, 5ª and inner front and back stops 11, 12, 13, and 14. In the present instance I have shown the inner stops formed at the ends of members 15 and 16 which are secured to the draft sills by means of rivets. In order to support the parts of the draft rigging structure hereinafter described I provide supports 70 secured to the lower flanges of the channel irons forming draft sills 1, 2. The members 70 extend transversely from one draft sill to the other and are provided with upturned ends which upon their inner faces are provided with grooves 61, 62. The clearance between the upturned ends 63, 64 of the support 70 is sufficient to permit the lower flanges of the draft sills to be received between them. Plates 65, 66, resting upon the upper surfaces of the lower flanges of the channel iron draft sills 1, 2 engage the grooves 61, 62, and are held in position by means of bolts 67, 68 which pass through apertures in said plates, in the flanges of the draft sills in the support 70. Ordinarily two of the supports 70 will be found sufficient. The coupler draw-bar 17 is secured to the usual yoke 18, the latter resting in recesses 60 in the upper sides of the support 70, and surrounding the draft gear elements described below. Between the draft sills is a casing 6 provided at its ends with vertical shoulders 7, 8, 9 and 10, the inner faces of which constitute stops coacting with the draft sills stops 11, 12, 13 and 14. The casing is open at the ends and preferably also at the top and bottom.

Figure 1:
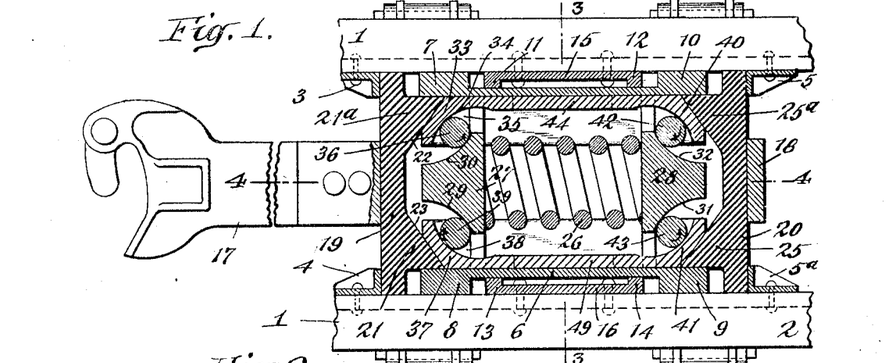
Figure 1 is a sectional plan view of a draft rigging embodying the invention and showing the same in normal position.

Coacting directly with the ends of the yoke 18 are outer followers or thrust members 19 and 20. Upon their inner faces the thrust members 19 and 20 are provided with inclined surfaces 22, 23, which in the present instance are formed upon projections 21, 21ª, 25, 25ª, upon the inner faces of said members. Coacting with the outer thrust members 19 and 20 are the intermediate thrust members 44, 49, of the form illustrated in Fig. 6. These intermediate thrust members are provided at their ends with inclined surfaces coacting with the inclines 22, 23, upon the outer thrust members in such manner that when the outer thrust members are forced toward each other in the line of draft the intermediate thrust members 44, 49, move inwardly transversely to the line of draft. The outward movement of the outer thrust members 19, 20, is limited by the front and back stops 3, 4, 5 and 5ª upon the draft sills. The casing 6 is free to move between the inner stops 11, 12, 13 and 14 and the outer thrust members 19 and 20. The outer thrust members 19, 20 are free to move inwardly until they have contacted with the shoulders 7, 8, 9 and 10 upon the casing 6 and forced the inner faces of these shoulders into contact with the stops 11, 12, 13 and 14.

The inner thrust members 27 and 28 are separated normally to the limit of their movement by the draft spring 26. The form of the inner thrust members, or followers is clearly shown in Fig. 6ª. Guide lugs 50, 51, extend horizontally from the thrust members 28 and 27, engaging apertures 52 and 53 in the intermediate thrust members 44, 49. The thrust members 44 and 49 take the form of a box having one open side, and the apertures 52, 53, in the faces thereof are of such form and dimensions as to permit a relative movement between the inner thrust members 27, 28, and the intermediate thrust members, both in the line of draft and transversely thereto. Guide lugs 54, 55, upon the upper and lower surfaces of the inner thrust members 27, 28 engage guide grooves 56, 57, formed in the inner side of the top and bottom walls of the casing 6. The interior of each end wall of the intermediate thrust members 44, 49, takes the form of a surface presenting a different inclination at different points to the line of draft, these surfaces in the present instance having a continuously curved contour. Upon their outer faces, the inner thrust members 27, 28, are also formed with similar surfaces, the complementary and coacting surfaces being concaved and converging toward each other toward their ends. Pressure is transmitted between the surfaces of the inner thrust members which are designated on the drawings by the numerals 29, 30, 31, 32, and those upon the intermediate thrust members, which are designated 33, 37, 40, 41, through pressure rollers 36, 39, 42 and 43.

From the foregoing it will be apparent that pressure upon either of the outer thrust members 19, 20, due to a buffing or draft shock will force one of the followers toward the other, either the front or back follower remaining stationary according to the direction of the shock. The inward movement of either of the outer followers or thrust members will through the coaction of the inclined faces 22, 23, with the outer inclines at the ends of the intermediate thrust members 44, 49, cause the latter to move inwardly transversely of the line of draft, the ratio of the extent of movement of the intermediate thrust members to that of the outer thrust members being dependent upon the degree of inclination of the coacting surfaces between these members. The inward movement of the intermediate thrust members will be communicated to the inner thrust members 27, 28, through the rollers 36, 39, 42 and 43. The ends of these rollers may be received in suitably formed guide slots 47, 48, upon the inner faces of the side walls 45, 46, of the intermediate thrust members.

Figure 2:
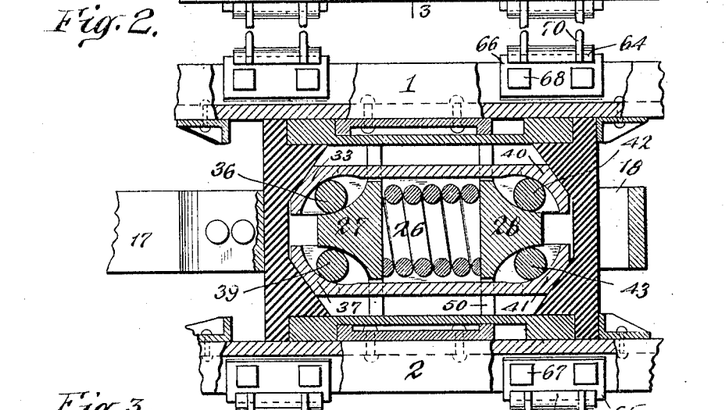
Fig. 2 is a view similar to Fig. 1, the device being shown in compressed position.
Figure 3:
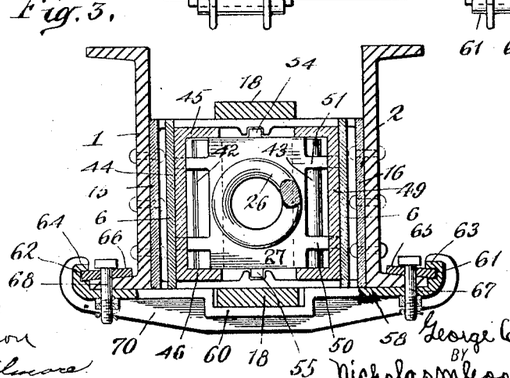
Fig. 3 is a transverse section on the line 3—3 of Fig. 1.
Figure 4:
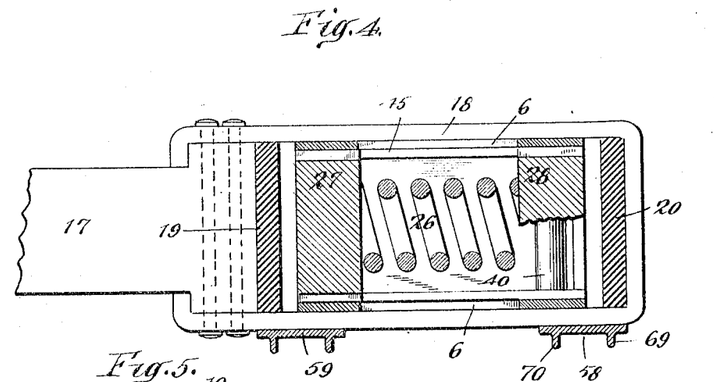
Fig. 4 is a sectional elevation on the line 4—4 of Fig. 1.
Figure 5:
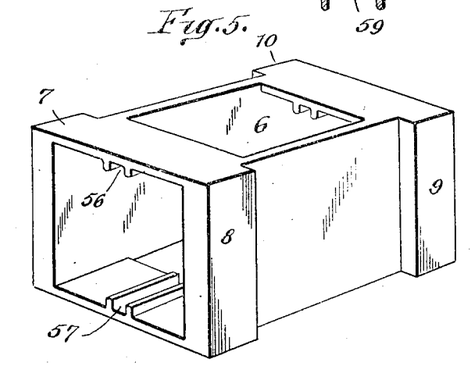
Fig. 5 is a perspective view of a casing member forming part of the structure shown in Figs. 1 to 4.
Figure 6:
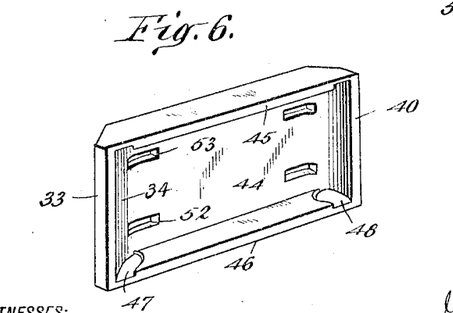
Fig. 6 is a perspective view of one of the thrust members forming part of the structure shown in Figs. 1 to 4.
Figure 6A:
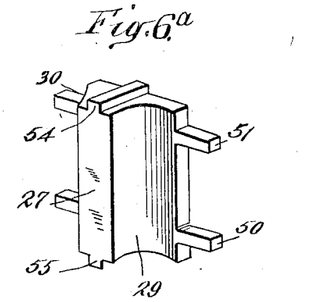
Figure 21:
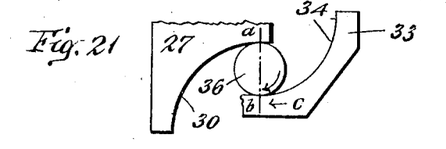
Figs. 21 and 22 are diagrammatic views showing the operation of a roller and a pair of thrust members having curved faces.
Figure 22:
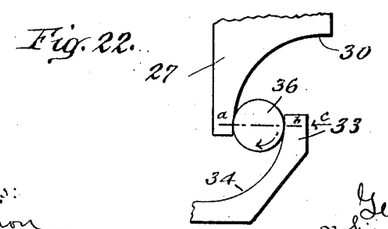

Upon reference to Fig. 1 and Fig. 22 it will be apparent that at the beginning of the movement of the intermediate thrust members from their outer position a comparatively small component of their movement will be communicated to the inner thrust members 27, 28, the latter having movement only in the line of draft. This is due to the fact that in their normal positions the coacting parts of the thrust faces upon the intermediate and inner thrust members are in planes inclined but slightly to the transverse axis of the draft rigging, thus permitting the rollers to roll inward without transmitting a large amount of longitudinal movement to the inner thrust members. Owing to the curved form of the coacting thrust faces upon the intermediate and inner thrust members the inclination of the parts of these faces which contact with the rollers increases as the rollers move inward, until in the extreme position illustrated in Fig. 21, the rollers contact with parts of the thrust surfaces which are substantially normal to the transverse axis of the draft rigging. This latter position is the dead position of the rigging, and represents the relative position of these parts when the movement of the outer follower or thrust member is arrested. For instance, as shown in Fig. 2 the thrust member 19, is in contact with the shoulders 7 and 8, of the casing 6 and has forced said shoulders against stops 11 and 13 upon the draft sills. The gradual acceleration of the resistance, or decrease in the component of the applied force acting to compress the spring 26, results from the fact that the coacting faces of the intermediate and inner thrust members present different angles to each other at different points, and therefore the force transmitted to the intermediate thrust members is applied to the inner thrust members with different degrees of efficiency during the compression of the draft rigging.

The rollers interposed between the thrust faces render it possible to vary the angularity of the thrust faces to practically any extent desired, and to use surfaces of any desired degree of inclination to the line of draft without danger of causing the coacting members to bind.

Of course, it will be apparent that the general type of apparatus illustrated in Figs. 1 to 6ª may be made without adhering to all the details of construction illustrated and above described, and that any arrangement of parts having coacting thrust members, one movable at an angle to the line of draft and having thrust surfaces of varying angularity with an intervening pressure transmitting member may be used in the practice of my invention. It is not necessary in all cases that the mechanism be duplicated at each end of the draft rigging, or that plane friction surfaces be employed in addition to the coacting surfaces of varying angularity. When such plane coacting thrust surfaces are used in addition to thrust surfaces of varying angularity with an intervening pressure transmitting member, the latter surfaces may be so disposed as to secure the desired results in the operation of the draft rigging without introducing directly coacting friction members of such angularity as to cause them to bind or "stick".

Upon the expansion of the draft rigging after the cessation of a draft or buffing shock the force is applied to the mechanism in the reverse direction, due to the pressure of the spring 26 against the inner faces of the inner thrust members 27, 28. As the force of the spring acts at right angles the force exerted through the intermediate thrust members 44, 49, the shock due to the expansion of the spring will be absorbed in a manner similar to that above explained in connection with the absorption of buffing and draft strains. Referring to Figs. 2 and 21, it will be apparent that at the initiation of the return movement of the inner thrust member from its position of compression only a small component of its movement will be transmitted to the intermediate thrust member, but that as the outward movement of the inner thrust member continues an increasing component of its movement is transmitted to the intermediate thrust member. By reason of this action the larger part of the recoil force of the spring is absorbed in the draft rigging without producing any great amount of movement of the parts, the greater part of the return movement of the parts being effected after the force of the spring is largely exhausted. In this way the return of the parts to normal position is accomplished without shock.

I will now proceed to a description of several modified structures in which the principles of my invention may be applied.

Figure 7:
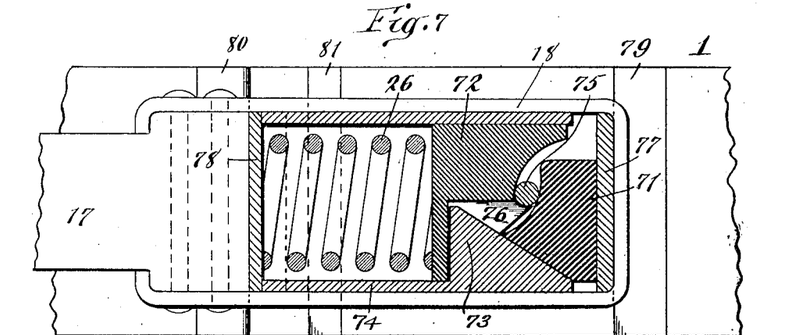
Fig. 7 is a sectional elevation of a modified form of draft rigging embodying my invention.

Fig. 7 is an elevation of a draft rigging in which mechanism for accelerating the resistance is provided at one end only of the draft rigging. The part 17 is the usual draw-bar to which is connected a yoke 18 embracing the draft rigging. Stops 79, 80 and 81 are provided upon the draft sills for limiting the movement of the front and rear follower plates 78, 77. Lying against and directly coacting with the rear follower 77 is a thrust member 71 provided upon its inner side with a thrust surface of a varying angularity and shown in the form of a continuously curved surface. The box or casing 74 is open at both ends and a thrust member 73 forms part thereof, this thrust member being provided with an inclined plane thrust surface coacting with a similar inclined plane surface upon the forward side of the thrust member 71. The rear spring follower 72 is formed with a curved thrust surface which coacts with the curved thrust surface upon the member 71 through a pressure roller 75. Web 76, extending from the projection upon which the curved thrust surface of the follower 72 is formed, supports the roller 75 in operative position when the parts of the draft rigging are not under pressure. It will be apparent that upon a draft strain the rear follower 77 will be drawn outwardly thus carrying with it the thrust member 71, which in turn will be moved transversely of the draft rigging through the wedging engagement of the inclined surfaces thereon and on the member 73. A certain component of the transverse movement of the member 71 will be communicated to the inner follower 72 through the roller 75, this component being quite small at first but gradually increasing as the roller reaches parts of the curved surfaces which have greater inclination to the transverse axis of the draft rigging. By means of this operation the resistance offered to the pull of the draw-bar will be gradually accelerated in a manner similar to that explained in connection with the form illustrated in Fig. 1, and the return of the parts to normal position will likewise take place under similar conditions to those explained in connection with Fig. 1. The operation of the parts under a buffing strain will be similar to that above explained, the inward movement of the follower 78 carrying with it the box 74 with its thrust member 73 and communicating a transverse movement to the thrust member 71.

Figure 8:
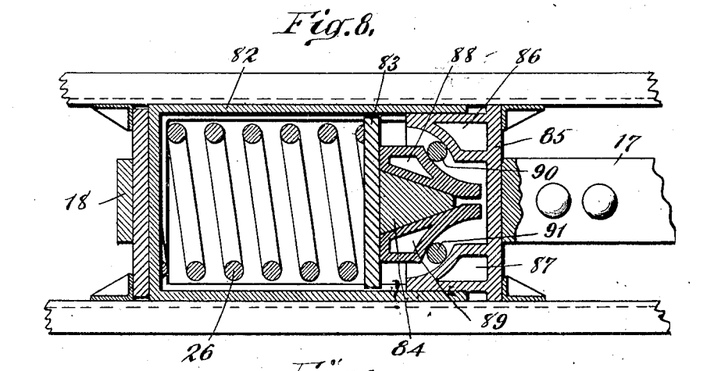
Figs. 8, 9, 10, 11 and 12 are sectional plan views of other modified forms of draft rigging embodying my invention.

In Fig. 8, I have shown a sectional plan view of another embodiment of my invention in which casing 82, open at its front end and also at its top and bottom back of the follower 83, contains a draft spring 26. The thrust member 84 is secured to or cast integral with the casing 82 and forms a bridge across the same. The intermediate thrust members 88, 89, are formed separately and provided with inclined plane faces coacting with similar faces upon the member 84, and with outer curved thrust faces which coact through rollers 90, 91, with similarly curved faces upon thrust members which are formed integrally with the outer follower 85. The thrust members of outer follower 85 may be cored out as indicated at 86 and 87 to lighten the structure, and similar core openings may be formed in the intermediate thrust members 88, 89. The usual stops are provided, as indicated, upon the draft sills. In this form of my invention, as in the others illustrated, the converging toward their ends of the thrust surfaces between which the pressure rollers are located serves an important function in preventing the rollers from moving idly and getting out of place when the pressure upon them is relaxed. Upon the application of a buffing strain to the mechanism shown in Fig. 8, the inward movements of the thrust members upon the follower 85 will be transmitted to the intermediate thrust members 88, 89, through the rollers 90, 91, this causing such intermediate thrust members to move inwardly from the end of the car and outwardly from the longitudinal axis of the draft rigging in diagonal lines, this setting up a frictional resistance between the surfaces of the thrust members 88, 89, and the surfaces of the thrust member 84 and the follower 83. This movement will result in carrying the follower 83 inwardly and compressing the spring. The component of the force communicated from the thrust members upon the follower 85 to the thrust members 88, 89, will progressively diminish, thus accelerating the resistance to the compression of the draft rigging. The front end of the casing 82 acts as a stop to limit the movement of the follower 85 and the parts are so arranged that the follower will contact with the front end of the box before the spring has been compressed beyond its limit of elasticity. Upon pulling strain the casing 82 moves forward or outward carrying with it the attached thrust member 84 thus communicating the same relative movement to the thrust members 88, 89 as was above explained in connection with the action of a buffing strain.

Figure 9:
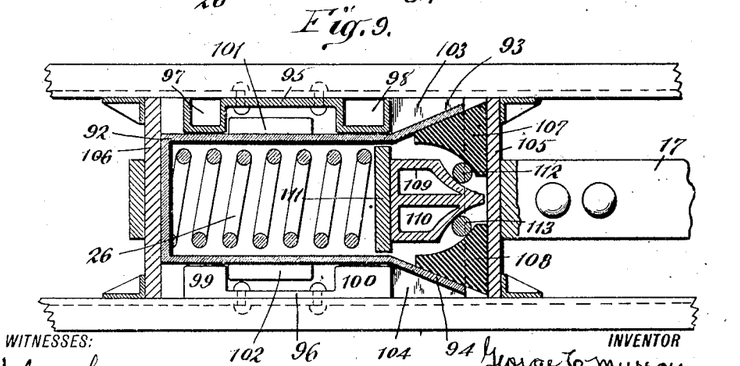

In the modified form shown in Fig. 9 the casing 92 is closed except at its outer end where it is provided with inclined side faces 93, 94. Riveted to the draft sills are cheek plates 95, 96, and having stops 98, 97, 99 and 100. Cast on the casing 92 are projections 101 and 102 to coöperate with the stops on the cheek plates. The casing also has cast thereon projections 103, 104 which coöperate with the stops 98, 100. 105 and 106 are the front and rear followers. The front follower bears against thrust members 107, 108, which have inclined faces working against the faces 93 and 94. The inner thrust member 109—110 bears against the inner follower 111 and the spring 26 bears against said inner follower and the end of the casing 92. The members 107, 108 are provided with curved inner walls coöperating through rollers 112 and 113 with coacting curved walls upon the inner thrust member 109—110. Under a buffing strain the members 107, 108, are carried backwardly and inwardly thus communicating an inward movement to the thrust member 109—110 which results in compressing the spring 26. During the progress of the buffing strain the action of the applied force upon the spring is similar to that above described in connection with other modifications of the invention.

Figure 10:
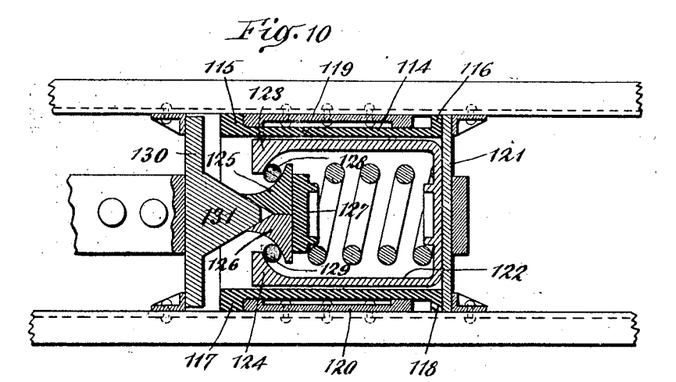

In the modification illustrated in Fig. 10 the casing 114 is closed all around except at its ends, which are open. The side walls of the casing are provided with stops 115, 116, 117 and 118 to coöperate with stops formed on the cheek plates 119 and 120. The rear follower 121 bears against a U-shaped member 122 on which are formed thrust members 123, 124. Intermediate thrust members 125, 126, bear against the bridge piece 127, which is formed integrally with the casing 114. The rollers 128, 129, operate between the curved thrust surfaces of the members 125 and 126, and the similar surfaces of the thrust members 123, 124, formed on the member 122. The front or outer follower 130 is cast integrally with a wedge member 131, the inclined surfaces of which coact with similar surfaces on the members 125 and 126. Under buffing strains the members 125 and 126, move outwardly transversely of the axis of the draft rigging, thus drawing the member 122 toward the end of the car by force transmitted to that member through the rollers 128 and 129. The acceleration of the resistance in this form of mechanism occurs in the manner previously explained. Under pulling strains the rear follower 121 moves the casing 114 outward, and the outward movement of the bridge 127 carries the members 125 and 126 which are thus spread apart by the action of the wedge 131 causing an operation of the mechanism similar to that occurring under a buffing strain.

Figure 11:
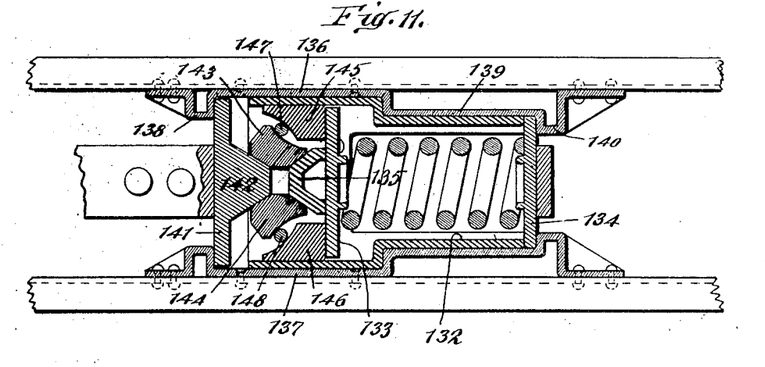

In the embodiment of my invention illustrated in Fig. 11 the casing 132 is open at both ends and also at the top and bottom back of the follower 133. The rear end of the casing is closed by the rear follower 134. A bridge 135 extends across and is cast integrally with the casing 132, the cheek plates 136 and 137 are each provided with stops such as 138, 139 and 140 to limit the movement of the casing 132. The front follower 141 is cast integrally with the wedge 142, the inclined faces of which coact with the thrust members 143, 144. The thrust members 143, 144 are also provided with inclined faces coacting with similarly inclined faces upon the bridge 135. The inner thrust members 145, 146, bear against the inner follower 133 and against the inner faces of the walls of the casing 132. The thrust members 143, 144, coact with the members 145 and 146 through curved thrust surfaces of the form above described, intervening pressure rollers 147, 148 being provided to transmit the pressure. Under buffing strains the thrust member or wedge 142 drives the thrust members 143 and 144 outwardly from the longitudinal axis of the draft rigging, thus through the rollers imparting backward movement to the thrust members 145 and 146 and compressing the spring. In this action the members 145 and 146 are also driven against the side walls of the casing 132, thereby generating frictional resistance. A similar action takes place under a pulling strain, and the action of the force applied and the acceleration of the resistance takes place in the manner set forth in connection with the forms above described.

Figure 12:
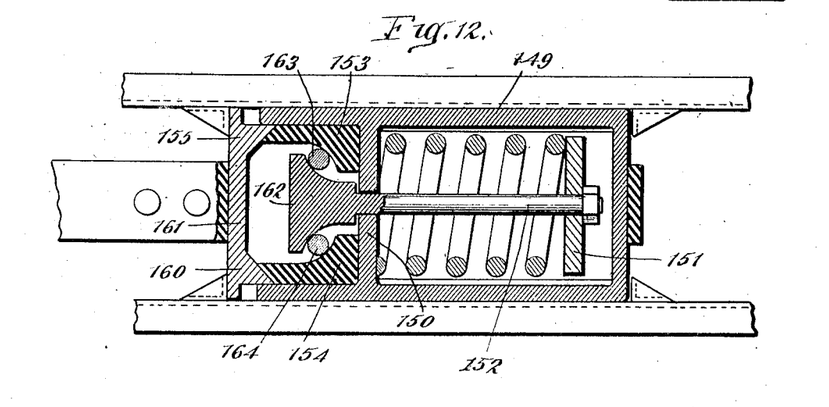

The form shown in Fig. 12 comprises a casing 149 open at its front, and also at top and bottom back of the apertured bridge piece 150. Within the casing is a follower 151 secured to the bolt 152 which passes through the bridge piece 150. The side thrust members 153 and 154 bear against the bridge piece 150 and their front ends are inclined and coöperate with similarly inclined faces formed on the inner side of the follower 161. Secured to the rod 152 is a head 162 having upon each side a curved thrust surface, which surfaces coöperate with similarly formed thrust surfaces upon the members 153 and 154. Under buffing strains the thrust members 153 and 154 are driven toward each other by the action of inclined thrust members 155 and 160 formed on the follower 161, and this movement causes the rollers to move backward and toward each other thus driving the head 162 outwardly and compressing the spring. Similar action takes place upon a pulling strain. This embodiment of my invention also operates in accordance with the principles above explained.

Figure 13:
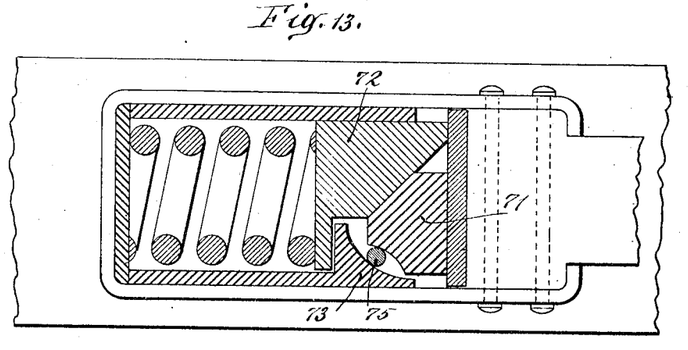
Fig. 13 is a sectional elevation of a further modified form of draft rigging embodying my invention.

In Fig. 13 I illustrate a construction similar to that shown in Fig. 7, except that the casing is open at both ends and the recess for the roller 75 is formed between the thrust member 73 upon the casing and the thrust member 71, and the plane wedging action takes place between the member 71 and the member 72. A similar re-arrangement of the curved and plane bearing surfaces may be made in the other forms of my invention herein described.

Figure 14:
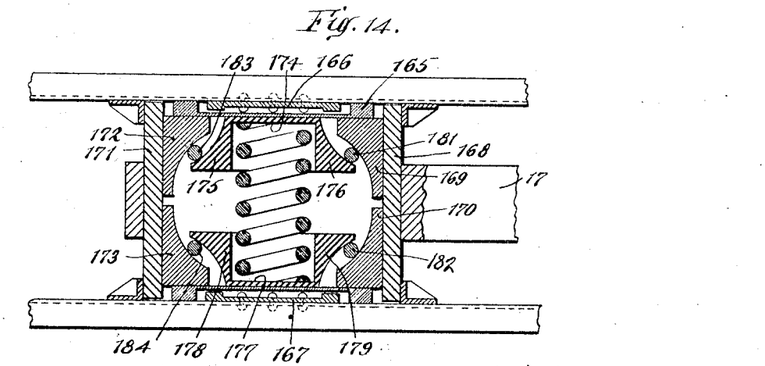
Fig. 14 is a sectional plan view of still another form of draft rigging in which my invention may be applied.

Fig. 14 illustrates a form of my invention in which there is no wedging action between plane inclined surfaces. In this form the means for transmitting force from the drawbar, or force-applying member, to the thrust members 169, 170, 172, 173, 174 and 177, does not include members having coacting inclined plane surfaces. In this form the casing 165 is open at both ends and has a movement limited by the stops on the cheek plates 166 and 167. The front follower 168 bears against thrust members 169 and 170 whose side faces frictionally engage the walls of the casing. The rear follower 171 bears against similar thrust members 172 and 173. 174 and 177, are centrally recessed members movable transversely of the draft rigging and normally held apart by means of a transverse spring. The members 174 and 177 are formed with projections 175, 176, 178 and 179 which constitute thrust members having curved outer thrust faces which coact through pressure rollers 181, 182, 183 and 184 with the inner curved thrust surfaces of the members 169, 170, 172 and 173. Under a buffing strain the thrust members 169 and 170 are moved rearwardly thus causing the members 174 and 177 to move toward each other compressing the draft spring. Under a pulling strain a similar action takes place, due to the forward movement of the thrust members 172 and 173. In this arrangement the thrust members 169, 170, 172 and 173 have frictional engagement with the inner walls of the casing 165. The acceleration of the resistance to shocks on the drawbar takes place in this embodiment of the invention in the manner hereinbefore explained.

Figure 17:
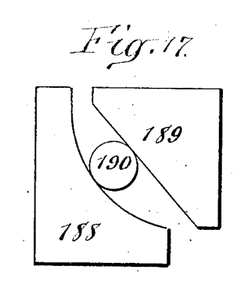
Fig. 17 is a diagrammatic view showing one thrust member having a continuously curved working face, a pressure-transmitting roller and a second thrust member having a plane surface.
Figure 18:
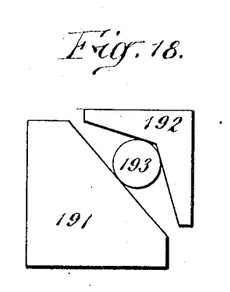
Fig. 18 is a diagrammatic view showing one thrust member provided with a plane working surface and the other with a working surface composed of plane surfaces disposed at an angle each to the other.
Figure 19:
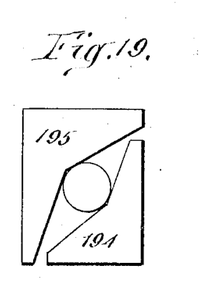
Fig. 19 is a diagrammatic view showing thrust members each with working surfaces made up of plane surfaces angularly related.
Figure 20:
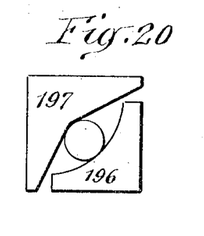
Fig. 20 is a diagrammatic view showing one of the thrust members with a continuously curved working surface and the other having a working surface made up of angularly disposed plane surfaces.

While I prefer the curved form of thrust surfaces as above described, the principle of my invention might be embodied in a structure having thrust members provided with thrust faces made up of a plurality of relatively inclined plane surfaces, as illustrated in Figs. 19, 18 and 20 in which figures the members 192, 194, 195 and 197, are shown as having such a form; or one of the thrust surfaces might be curved and the other a plane surface as shown in Fig. 17; or one surface might be plane and the other made up of a plurality of plane surfaces relatively inclined as shown in Fig. 18; or both thrust members might be provided with surfaces made up of plane surfaces relatively inclined; or a continuously curved surface might be used in conjunction with a surface made up of relatively inclined plane surfaces as illustrated in the members 196 and 197 shown in Fig. 20.

Figure 15:
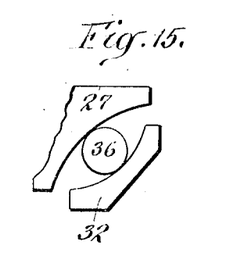
Fig. 15 is a detailed diagrammatic view showing the contour of the working faces of thrust members and an interposed roller member.
Figure 16:
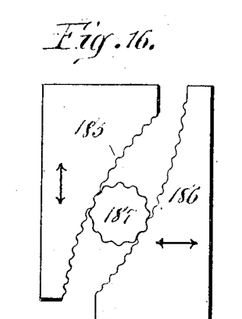
Fig. 16 is a diagrammatic view showing thrust members with an interposed pressure roller, all having corrugated or toothed working surfaces.

In Fig. 15 the pressure roller 36 is shown in an intermediate position. In some cases the surface of the pressure roller may be corrugated or toothed as illustrated in the roller 187 shown in Fig. 16, the thrust members 185 and 186 being provided with correspondingly toothed or corrugated faces.

While I have described several specific forms of mechanism in which the principle of my invention may be embodied, I would have it understood that my invention is not limited to the particular mechanisms herein illustrated and described, as various modifications or alterations may be made without departing from the principle of my invention as defined in the appended claims.

What I claim is:—

1. In a shock-absorber, a yielding resistance member, a force-applying member, opposed thrust members interposed between said force-applying member and resistance member, said thrust members having coacting surfaces variably inclined at different points to the line of action of said force-applying member, a movable pressure-transmitting member between said coacting surfaces, one of said thrust members being free to move bodily at an angle to the other, and means for transmitting force from said force-applying member to said thrust members.

2. In a shock-absorber, a yielding resistance member, a force-applying member, resistance accelerating means interposed between said resistance member and said force-applying member, said resistance accelerating means comprising opposed thrust members having coacting surfaces, presenting to each other different angles at different points, a movable pressure-transmitting roller between said coacting surfaces, one of said thrust members being free and bodily movable at an angle to the other, and means for transmitting force from said force-applying member to said thrust members.

3. In a shock-absorber, a yielding resistance member, a force-applying member, opposed thrust members interposed between said force-applying member and resistance member, said thrust members having coacting surfaces variably inclined at different points to the line of draft upon said draw bar, a bodily movable pressure-transmitting member between said surfaces, and means for transmitting force from said force-applying member to said thrust members.

4. In a shock-absorber, a yielding resistance member, a force-applying member, resistance accelerating means interposed between said resistance member and said force-applying member, said resistance accelerating means comprising opposed thrust members having coacting surfaces presenting to each other different angles at different points, a bodily movable pressure transmitting roller between said surfaces, and means for transmitting force from said force-applying member to said thrust members.

5. In a device of the class described, a yielding resistance member, a force-applying member, thrust members interposed between said resistance member and force-applying member, said thrust members having their coacting surfaces converging toward each other toward their ends, one of said thrust members being free to move at an angle to the other, a pressure transmitting member between said converging surfaces, and means for transmitting force from said force-applying member to said thrust members.

6. In a shock-absorber, a yielding resistance member, a force-applying member, resistance accelerating means interposed between said resistance member and said force-applying member, said resistance accelerating means comprising opposed thrust members having their coacting surfaces converging toward each other toward their ends, a pressure-transmitting roller between said converging surfaces, and means for transmitting force from said force-applying member to said thrust members.

7. In a draft gear, a yielding resistance member, a draw-bar, three thrust members interposed between said resistance member and draw-bar, said thrust members having coacting inclined surfaces, the coacting surfaces between two of said members presenting to each other different angles at different points, and a pressure-transmitting member between said surfaces.

8. In a draft gear, a yielding resistance member, a draw-bar, three thrust members interposed between said resistance member and draw-bar, two of said thrust members having coacting inclined plane surfaces, and one of said two thrust members and the third thrust member having coacting surfaces presenting to each other different angles at different points, and a pressure roller between said surfaces.

9. In a draft-rigging, a draw-bar, a yoke secured thereto, a yielding resistance member, outer, inner and intermediate thrust members, said resistance member and thrust members being embraced by said yoke, said intermediate thrust members having surfaces inclined to the line of draft and coacting with similarly inclined surfaces upon said outer thrust members, said intermediate and inner thrust members having coacting surfaces presenting to each other different angles at different points, and a pressure transmitting member between said surfaces.

10. In a draft rigging, a yielding resistance member, a coupler, outer thrust members directly coacting with said coupler, inner thrust members directly coacting with said resistance member, said inner and outer thrust members being movable in the line of draft of the coupler upon the application of power, intermediate thrust members having surfaces inclined to the line of draft and coacting with similarly inclined surfaces upon said outer thrust members, said intermediate and inner thrust members having coacting surfaces presenting to each other different angles at different points, and a pressure transmitting roller between said surfaces.

11. In a draft rigging, a draw-bar, a yoke secured thereto, a yielding resistance member, outer, inner and intermediate thrust members, said resistance and thrust members being embraced by said yoke, said intermediate thrust members having inclined surfaces at their ends, coacting with similarly inclined surfaces on said outer thrust members, said intermediate and inner thrust members being also provided adjacent their ends with curved surfaces, and a pressure member through which pressure is transmitted between the curved surfaces upon said intermediate and inner thrust members.

12. In a draft rigging, a yielding resistance member, a coupler, a yoke secured to said coupler, outer thrust members coacting directly with said yoke, inner thrust members coacting directly with said yielding resistance member, intermediate thrust members each of which has inclined surfaces at its ends coacting with similarly inclined surfaces on said outer thrust members, said intermediate and inner thrust members being also provided adjacent their ends with curved surfaces, and a pressure roller through which pressure is transmitted between the curved surfaces upon said intermediate and inner thrust members.

13. In a device of the class described, a yielding resistance member, a coupler, outer thrust members directly coacting with said coupler, inner thrust members directly coacting with said resistance member, said inner and outer thrust members being movable in the line of draft of the coupler upon application of power, intermediate thrust members, said intermediate thrust members having inclined surfaces coacting with inclined surfaces upon said inner and outer thrust members, one set of said inclined surfaces being of varying inclination, pressure rollers between said last named surfaces, and guide lugs upon said inner thrust members coacting with slots in said intermediate thrust members.

14. In a device of the class described, a yielding resistance member, a coupler, outer thrust members directly coacting with said coupler, inner thrust members directly coacting with said resistance member, said inner and outer thrust members being movable in the line of draft of the coupler, upon the application of power, intermediate thrust members, said intermediate thrust members having inclined surfaces coacting with inclined surfaces upon said inner and outer thrust members, one set of said inclined surfaces being of varying inclination, pressure rollers between said last named surfaces, guide lugs upon said inner thrust members coacting with slots in said intermediate thrust members, said intermediate thrust members being provided with guides for said rollers.

15. In a device of the class described, draft sills, inner and outer stops fixed thereto, a casing movable between said stops, outer thrust members movable between said stops and said casing, said outer thrust members having inclined surfaces upon their inner faces, intermediate thrust members having inclined end surfaces coacting with the inclined faces on said outer thrust members, inner thrust members, a yielding resistance member between said inner thrust members, said intermediate and inner thrust members having coacting surfaces presenting to each other different angles at different points, guides upon said inner thrust members and coacting guides upon said intermediate thrust members and said casing.

16. In a device of the class described, draft sills, inner and outer stops fixed thereto, a casing movable between said stops, outer thrust members movable between said stops and said casing, said outer thrust members having inclined surfaces upon their inner faces, intermediate thrust members having inclined end surfaces coacting with the inclined faces on said outer thrust members, inner thrust members, a yielding resistance member between said inner thrust members, said intermediate and inner thrust members having coacting surfaces presenting to each other different angles at different points, pressure rollers between said surfaces, guides upon said inner thrust members and coacting guides upon said intermediate thrust members and said casing, said intermediate thrust members being provided with guides for said pressure rollers.

In testimony whereof, I have signed my name to this specification, in the presence of two subscribing witnesses.

GEORGE C. MURRAY.

Witnesses:
BEATRICE MIRVIS,
IDA G. GILMORE.